US012750940B2

(12) United States Patent
Zhang et al.

(10) Patent No.: US 12,750,940 B2
(45) Date of Patent: Sep. 29, 2026

(54) BLOCKER ROTARY-SWITCHING DEVICE, CONTROL METHOD THEREOF, AND ACCELERATOR

(71) Applicant: Nuctech Company Limited, Beijing (CN)

(72) Inventors: Liang Zhang, Beijing (CN); Yaohong Liu, Beijing (CN); Hao Zha, Beijing (CN); Yu He, Beijing (CN)

(73) Assignee: Nuctech Company Limited, Beijing (CN)

( * ) Notice: Subject to any disclaimer, the term of this patent is extended or adjusted under 35 U.S.C. 154(b) by 162 days.

(21) Appl. No.: 18/501,435

(22) Filed: Nov. 3, 2023

(65) Prior Publication Data

US 2024/0215146 A1 Jun. 27, 2024

(30) Foreign Application Priority Data

Dec. 22, 2022 (CN) ......................... 202211656517.7

(51) Int. Cl.
*H05H 7/00* (2006.01)
*G21K 1/00* (2006.01)

(52) U.S. Cl.
CPC ............... *H05H 7/001* (2013.01); *G21K 1/00* (2013.01)

(58) Field of Classification Search
None
See application file for complete search history.

(56) References Cited

U.S. PATENT DOCUMENTS 5,945,684 A * 8/1999 Lam ......................... G21K 1/04 378/65
2011/0075815 A1* 3/2011 Brown ................. A61N 5/1048 378/138

(Continued)

FOREIGN PATENT DOCUMENTS

CN 102033239 A 4/2011
CN 102109605 A 6/2011

(Continued)

OTHER PUBLICATIONS

"CN Application No. 202211656517.7 Chinese First Office Action mailed Aug. 6, 2025", with English translation, 15 pages.

(Continued)

*Primary Examiner* — Hoon K Song
(74) *Attorney, Agent, or Firm* — Schwegman Lundberg & Woessner, P.A.

(57) ABSTRACT

The present application relates to a blocker rotary-switching device, a control method thereof and an accelerator, the device including: a plurality of blockers for changing dose distribution of rays output from an accelerating tube of an accelerator, the plurality of blockers including blockers which have different change amounts to the dose distribution; and a rotary switch installed with the plurality of blockers and switching positions where the blockers are installed by rotation so as to locate the blocker at an installation position corresponding to a target dose distribution at an outlet of the accelerating tube. By providing a plurality of blockers and rotatably switching the plurality of blockers, a plurality of dose distributions can be achieved without frequently replacing the blocker.

12 Claims, 4 Drawing Sheets

(56) References Cited

U.S. PATENT DOCUMENTS

| | | | | |
|---|---|---|---|---|
| 2013/0221243 | A1* | 8/2013 | Perkins | G21K 1/04 378/65 |
| 2013/0261430 | A1* | 10/2013 | Uhlemann | A61N 5/1077 378/65 |
| 2021/0031053 | A1* | 2/2021 | Zhao | A61N 5/1045 |
| 2022/0125393 | A1* | 4/2022 | Helm | A61B 6/032 |

FOREIGN PATENT DOCUMENTS

| | | | |
|---|---|---|---|
| CN | 103645494 | A | 3/2014 |
| CN | 105251138 | A | 1/2016 |
| CN | 105797282 | A | 7/2016 |
| CN | 206103130 | U | 4/2017 |
| CN | 108449859 | A | 8/2018 |
| CN | 108594285 | A | 9/2018 |
| CN | 219204770 | U | 6/2023 |
| JP | 01126600 | A | 5/1989 |
| JP | H0757675 | A | 3/1995 |
| JP | 2001170194 | A | 6/2001 |
| JP | 2003079753 | A | 3/2003 |

OTHER PUBLICATIONS

"CN Application No. 202211656517.7 Office Action dated Mar. 9, 2026", w English Translation, Mar. 9, 2026, 7 pgs.

* cited by examiner

BLOCKER ROTARY-SWITCHING DEVICE, CONTROL METHOD THEREOF, AND ACCELERATOR

CROSS REFERENCES TO RELATED APPLICATIONS

This application claims a priority of Chinese Patent Application No. 202211656517.7, filed on Dec. 22, 2022, and titled by "BLOCKER ROTARY-SWITCHING DEVICE, CONTROL METHOD THEREOF, AND ACCELERATOR," which is incorporated herein in its entirety.

TECHNICAL FIELD

The present disclosure relates to a technical field of linear accelerators, and particularly relates to a blocker rotary-switching device installed on an accelerator and a control method thereof, as well as an accelerator including the device.

BACKGROUND

Currently, electronic linear accelerator systems are mostly used as X-ray generation devices in large-scale vehicle/container security inspection equipment for customs, civil aviation, and railway transportation. The high-energy X-rays generated by the devices can perform non-destructive inspection on objects of different thicknesses and masses, enabling effective identification of items to be inspected without opening packages, and identification and label of contraband contained in the items to be inspected, thereby ensuring the personal and property safety of citizens and maintaining social stability.

In the current field of radiation imaging, X-ray projection imaging technology is mainly used for identification and detection of items to be inspected. For different items to be inspected, there are different requirements for amount and angular distribution of energy; however, in the current linear accelerator systems, the means for changing dose and angle distribution of rays are few, and thus a device for changing dose distribution is needed.

SUMMARY

An object of the present disclosure is to provide a blocker rotary-switching device that can change the dose distribution and an accelerator including the device.

According to one implementation of the present application, a blocker rotary-switching device is provided, which includes: a plurality of blockers for changing dose distribution of rays output from an accelerating tube of an accelerator, the plurality of blockers including blockers which have different change amounts to the dose distribution; and a rotary switch installed with the plurality of blockers and switching positions where the blockers are installed by rotation so as to locate the blocker at an installation position corresponding to a target dose distribution at an outlet of the accelerating tube. According to this implementation, the plurality of blockers is switched by rotation of the rotary switch, and thus the dose distribution of the rays output from the accelerating tube can be changed.

In the blocker rotary-switching device, the plurality of blockers includes blockers in different shapes. By the blockers in different shapes, the dose distribution can be changed more finely, so that the application range of the blocker rotary-switching device is wider.

In the above-mentioned blocker rotary-switching device, the rotary switch includes a blocker installation plate, which includes a plurality of installation locations, and the plurality of blockers are installed at the plurality of installation locations of the blocker installation plate.

In the above-mentioned blocker rotary-switching device, dose distributions of the rays output by the accelerating tube and penetrating through the respective installation locations are different from each other.

In the above-mentioned blocker rotary-switching device, the rotary switch further includes: a power mechanism that provides power for the rotary switch to rotate the rotary switch around an axis; a transmission mechanism that transmits the power from the power mechanism to the blocker installation plate; and a fixing-installation mechanism that fixes and installs the rotary switch onto the accelerator.

In the above-mentioned blocker rotary-switching device, the power mechanism includes a DC servo motor, the fixing-installation mechanism includes a motor seat and a base, the servo motor is fixedly installed on the base through the motor seat, and the base is fixedly installed on the accelerator.

In the above-mentioned blocker rotary-switching device, the transmission mechanism includes a pinion gear and a large gear, the pinion gear is connected to an output shaft of the DC servo motor, the large gear engages with the pinion gear, and the blocker installation plate is fixedly connected with the large gear.

In the above-mentioned blocker rotary-switching device, the fixing-installation mechanism further includes: a rotating shaft, and a ball bearing, the blocker installation plate is installed on the base through the rotating shaft and the ball bearing.

In the above-mentioned blocker rotary-switching device, on each installation location, one blocker is provided, and each blocker has a shape different from that of other blockers.

In the above-mentioned blocker rotary-switching device, the installation location is formed as a through hole; in at least some of the through holes, at least two blockers are installed along an axial direction of a same through hole, and the dose distributions of the rays output from the accelerating tube and penetrating through the respective through holes are different from each other.

In the above-mentioned blocker rotary-switching device, a control module is further included, the control module pre-stores corresponding relationship between the target dose distribution and the installation position of the blocker on the rotary switch; based on the corresponding relationship, the control module outputs control instructions to the rotary switch; the rotary switch rotates based on the control instructions, so that the blocker at the installation position corresponding to the target dose distribution is located at the outlet of the accelerating tube.

The second implementation of the present application provides an accelerator, which includes an accelerating tube; and the blocker rotary-switching device as mentioned above.

The second implementation of the present application provides a control method for a blocker rotary-switching device, where the blocker rotary-switching device is the blocker rotary-switching device in the above implementation, and the control method includes: outputting control instructions to the rotary switch based on pre-stored corresponding relationship between the target dose distribution and the installation position of the blocker on the rotary switch; and rotating the rotary switch based on the control instructions, so that the blocker at the installation position corresponding to the target dose distribution is located at the outlet of the accelerating tube.

The blocker rotary-switching device and accelerator of the present application can achieve changing of the dose distribution of the rays output by the accelerator's accelerating tube by rotatably switching different blockers.

DETAILED DESCRIPTION

The features of various aspects and exemplary embodiments of the present application will be described in detail, and in order to make the purpose, technical solutions, and advantages of the present application clearer, the present application will be described further in detail below by reference to the accompanying drawings and specific embodiments. It should be understood that the specific embodiments described here are only intended to explain the present application and not to limit it. For the person skilled in the art, the present application can be implemented without the need of some of these specific details. The description of the embodiments below is only intended to provide a better understanding of the present application by showing examples of the present application.

It should be noted that in the present application, relational terms such as first and second are only used to distinguish one entity or operation from another entity or operation, and do not necessarily require or imply any actual relationship or order between these entities or operations. Moreover, the terms “include”, “comprise”, or any other variations thereof are intended to encompass non-exclusive inclusion, such that a process, method, item, or device that includes a series of elements, not only includes these elements, but also other elements that are not explicitly listed, or also include elements inherent in such a process, method, item, or device. Without further limitations, the element limited by the statement “including . . . ” does not exclude the existence of other identical elements in the process, method, item, or device that includes the said element.

Before describing a blocker rotary-switching device to which the present application relates, the principle of changing a dose distribution of rays output from an accelerating tube by using a blocker and the effect of the blocker are described at first.

(Principle and Effect of Blocker)

Outlet rays of an accelerating tube of a linear accelerator are output generally in two forms, one form is directly outputting accelerated high-energy electron beams, and the other form is outputting X-rays generated after hitting targets with high-energy electron beams. Regardless of the forms of the output rays, according to application situations, corresponding requirements are usually put forward for dose rate and angular distribution, that is, dose distribution of the rays.

Under normal circumstances, the dose rate and angular distribution of the rays directly output from the accelerating tube may not meet the corresponding requirements, and thus a device that can change the dose distribution is needed.

Figure 1A:
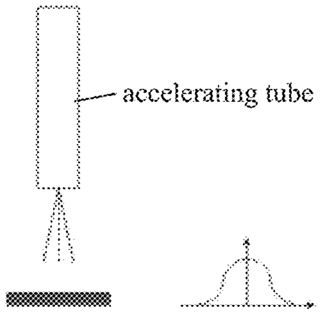
FIGS. 1(*a*) to 1(*b*) show an example of the effect of a blocker on changing dose distribution in the present application, where FIG. 1(*a*) shows the dose distribution before change, and FIG. 1(*b*) show the dose distribution after change.
Figure 1B:
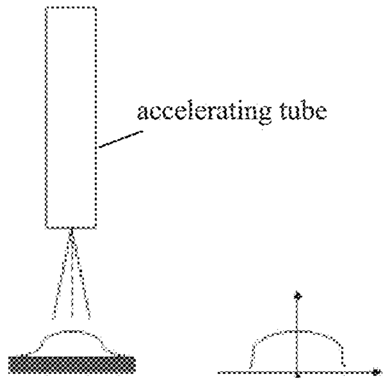

FIG. 1(*a*) to FIG. 1(*b*) show an example of the effect of a blocker on changing the dose distribution, where FIG. 1(*a*) shows the dose distribution before the change, and FIG. 1(*b*) shows the dose distribution after the change. In FIGS. 1(*a*) to 1(*b*), curve graphs on right side represent the dose distribution of the output rays.

The inventor of the present application found that if installing a blocker made of a metal material (such as lead and tungsten) in a special shape as shown in FIG. 1(*b*), at an outlet of the accelerating tube of the accelerator, the dose distribution originally as shown in FIG. 1(*a*) can be changed to the dose distribution as shown in FIG. 1(*b*), and in this case, the low-energy components in the rays can be effectively reduced and the performance of the rays can be improved.

Figure 2:
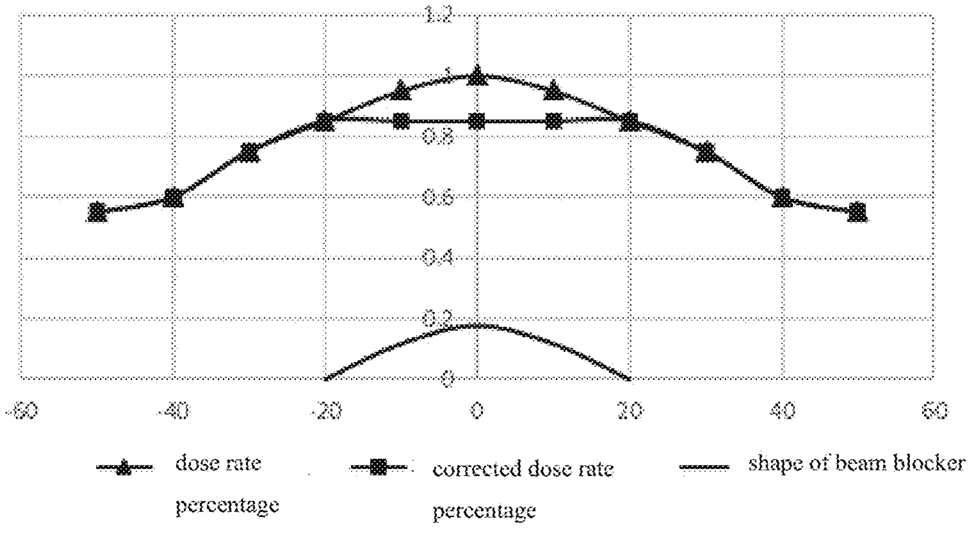
FIG. 2 is another example showing the effect of the blocker on changing dose rate percentage in the present application.

Since the rays present different dose distributions at different angles, the rays cannot meet the usage requirements in application situations that require consistent dose rate and angle distribution due to the difference. Therefore, in the present application, by the effect of the blocker, it can be achieved that the dose rate and angle distribution tend to be consistent. As shown in FIG. 2, the unevenly distributed dose distribution can be flattened by the effect of the blocker.

FIG. 2 is another example showing the effect of the blocker on changing dose rate percentage, where the horizontal axis represents a distance of the rays from a main axis of the accelerating tube, measured in cm, and the vertical axis represents the dose rate percentage. The points in shape of triangle represent the dose rate percentage before the blocker is provided, that is, the curve connecting the points in the shape of triangle represents the original “dose rate percentage”, while the points in shape of square represent the dose rate percentage after the blocker is provided, that is, the curve connecting the points in the shape of square represents the “corrected dose rate percentage”. In addition, the curve “shape of beam blocker” in FIG. 2 represents a cross-sectional shape and providing position of the blocker provided in this example.

As can be seen from FIG. 2, before the blocker is provided, the dose rate percentage of the original output of the accelerating tube has a clear peak, and is not flat; however, after the blocker in the shape as shown in FIG. 2 is provided within the range of (−20, 20) deviating from the main axis at the outlet of the accelerating tube, the dose rate percentage tends to be consistent within the range of (−20, 20) deviating from the main axis, and there is a flat region in the curve. That is, by providing the blocker, the curve of the dose rate percentage can be flattened.

In order to better understand the effect of the blocker, the description will be made below by comparing with a shielding body.

In principle, the blocker in present application blocks or attenuates the rays by high atomic number metal materials, which is consistent with the principle of the shielding body. The main effect of the blocker in present application is to modify the rays, that is, to adjust properties, such as energy and angle of the electron beams or X-rays output from the accelerating tube. However, the effect of the shielding body tends to radiation protection requirements, which reduces the dose of X-rays through thickness of the materials to the dose that meets the protection requirements; for example, in the commonly used half value layer method for measuring energy, since steel plates of different thicknesses have different attenuation rates for different energies, the specific energy of X-rays can be determined.

Figure 3:
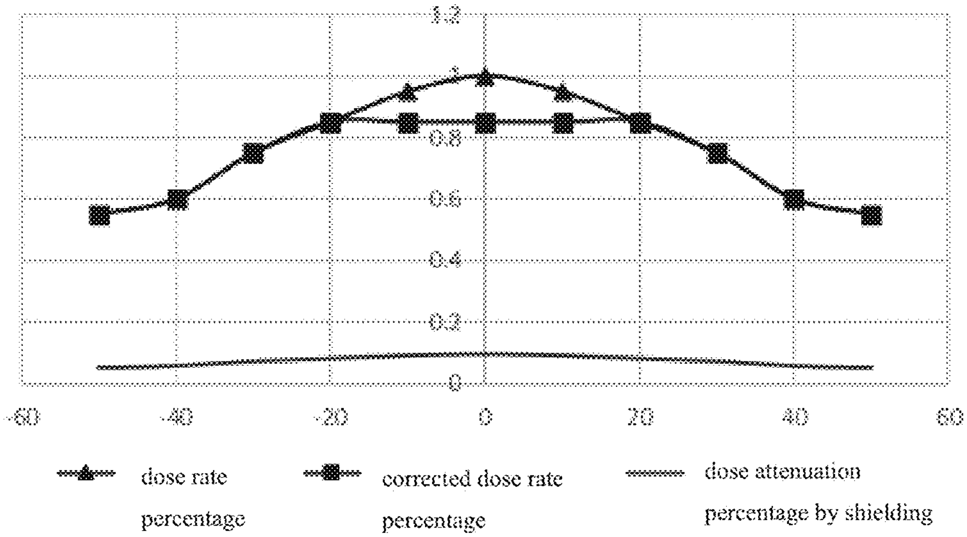
FIG. 3 is a diagram comparing the effect of the blocker involved in the present application and that of a shielding body on dose distribution.

FIG. 3 is a diagram of comparing the effect of the blocker involved in the present application with that of a shielding body on the dose distribution. The points in shape of triangle represent dose rate percentage before a blocker is provided, while the points in shape of square represent the dose rate percentage after a blocker is provided.

When performing dose shielding on a tube body of the accelerating tube in the accelerator, it is also a high atomic number material that is used for attenuating the rays, and by increasing an overall thickness of the material, the rays can be shielded and reduced to 1% or less than 5%. The blocking and attenuation effect of the shielding body of the tube body on the rays is shown in the curve of "dose attenuation percentage by shielding" in FIG. 3.

The curve of "corrected dose rate percentage" in FIG. 3 is a schematic diagram when a blocker is used in simulation calculation, and the dose distribution can be corrected by the blocker and thus tend to be flat within a desired range, that is, forming a waveform with a flattened peak.

As can be seen, compared to the effect of the blocker, the effect of the shielding body tends to radiation protection requirements; generally, the shielding body is used for shielding of the tube body of the accelerating tube in the accelerator, and thus, the shielding body generally has the same thickness and has the same cross-sectional shape, and by the thickness of the shielding body, the energy is basically uniformly reduced. However, the blocker of present application can change the dose distribution of the rays output by the accelerating tube. By providing a specific shaped blocker at the outlet of the accelerating tube, the angular distribution at the outlet can tend to be consistent, that is, as shown in FIGS. 2 and 3, the curve of the dose rate percentage can be flattened, which can be applied to the application situations that require consistent dose rate and angular distribution.

The adjustment effect of the blocker on the dose distribution varies depending on the shape, thickness of the blocker, or material used to make the blocker, and by adjusting at least one of the shape, thickness of the blocker, and the material used to make the blocker, a plurality of blockers with different change amounts to the dose distribution can be obtained.

Based on the above principle, the present application provides a blocker rotary-switching device that can rotate and switch a plurality of blockers with different change amounts to the dose distribution, and an accelerator installed with said device.

First Implementation

Below, the blocker rotary-switching device of the first implementation of the present application will be described in combination with FIGS. 4 and 5(*a*) to 5(*b*).

Figure 4:
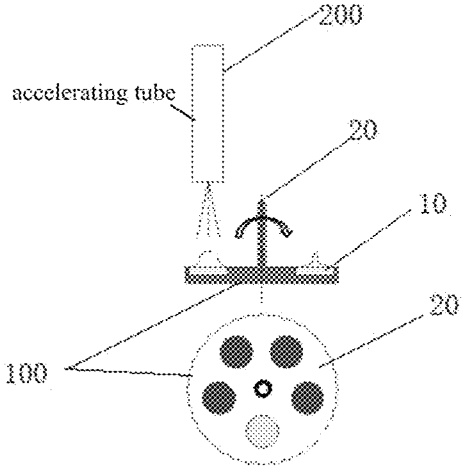
FIG. 4 is a schematic diagram showing a blocker rotary-switching device according to a first implementation.

As shown in FIG. 4, the blocker rotary-switching device 100 includes a plurality of blockers 10 and a rotary switch 20.

The blockers 10 are adapted to change the dose distribution of rays output by an accelerating tube 200 of an accelerator. A plurality of blockers 10 are provided, which include blockers with different change amounts to the dose distribution. The plurality of blockers 10 may include blockers which have different thicknesses, materials, or shapes, and thus have different change amounts to the dose distribution.

Figure 5A:
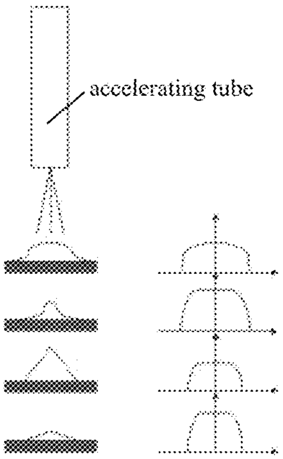
Figs. 5(*a*) to 5(*b*) show design examples of shapes of a plurality of blockers 10 involved in the first implementation of the present application.
Figure 5B:
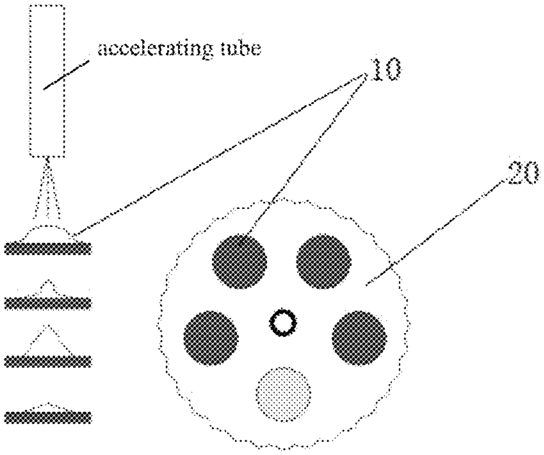

FIGS. 4 and 5(*a*) to 5(*b*) show examples of the plurality of blockers 10 of different shapes When the shapes of the blockers 10 are different, the change amounts of the respective blockers 10 to the dose distribution are different from each other. Specifically, cross sections of the plurality of blockers 10 in a longitudinal direction are different in shape. The longitudinal direction is parallel to a direction of a main axis of the accelerating tube. FIGS. 4 and 5(*a*) to 5(*b*) show the cross sections in the longitudinal direction of the respective blockers 10 passing through centers of the respective blockers 10. These shapes of the cross sections are only examples, the shapes that can be used in practice are not limited to these and can be designed by simulation calculations based on original output of each accelerator and the target dose distribution. Compared to changing the dose distribution through the thickness or material of the blocker, by changing the dose distribution through the shape of the blocker, both the dose rate and angle can be finely adjusted, and more diverse target dose distributions can be provided, so that the blocker rotary-switching device and the accelerator can be applied in a more wider application range.

The rotary switch 20 is provided with a plurality of blockers, and switches positions where the blockers are installed by rotation, so that the blocker at an installation position corresponding to the target dose distribution is located at an outlet of the accelerating tube. In other words, by switching of the rotary switch 20, one or more blockers 10 corresponding to the target dose distribution among the plurality of blockers are respectively located at the outlet of the accelerating tube 200. Here, the target dose distribution refers to the dose distribution required in the application situation, which can be set according to the application situation.

FIG. 4 shows a case that four blockers 10 are installed in the rotary switch 20, but the number of blockers 10 is not limited to this.

FIGS. 5(*a*) to 5(*b*) show design examples of the shapes of the plurality of blockers 10. FIG. 5(*a*) shows the shapes of four blockers 10 and corresponding dose distributions, and FIG. 5(*b*) shows the installation relationship between the four blockers 10 and the rotary switch 20.

In FIGS. 4 and 5(*a*) to 5(*b*), dark colors are used to indicate installation locations where the blockers 10 are installed, and light colors are used to indicate installation locations where no blocker 10 is installed. The installation location is a position in the rotary switch 20 where the blocker 10 is installed.

FIGS. 4 and 5(*a*) to 5(*b*) show the case where the plurality of blockers 10 are designed in different shapes.

The rotary switch 20 includes five installation locations, where four installation locations are each installed with one blocker and these blockers have different shapes, while no blocker 10 is installed at the remaining one installation location. As a result, the rays emitted from one accelerating tube respectively and passing through the five installation locations respectively have different dose distributions. The plurality of blockers 10 are respectively installed on the installation locations of the rotary switch 20, and the installation locations can be located on an outer surface or inside of the rotary switch 20. That is, the installation locations can be fixed positions, pits, through boles, and the like on the surface of the rotary switch 20, as long as they are predetermined positions.

FIGS. 4 and 5(*a*) to 5(*b*) only show one example of the blockers 10 installed on the rotary switch 20, and this example is not unique. The number and positions of the installation locations are not limited to those shown in the figures, and as long as recording corresponding relationship among the shape of the blocker 10, the target dose distribution, and the installation location of the blocker 10 in advance, the rotary switch 20 can switch according to said corresponding relationship, so as to locate centers of the installation locations, i.e. the centers of the blockers, on the main axis of the accelerating tube 100, respectively.

Specifically, the corresponding relationship among the shape of the blocker 10, the target dose distribution, and the installation location can be obtained as below. Firstly, for the rays output from each accelerator, the shape of the blocker corresponding to each target dose distribution is obtained by simulation calculation in advance, and is verified through actual measurements. That is, the shape of the blocker can be designed according to the original output of the accelerating tube and the target dose distribution. Thus, the corresponding relationship between the shape of the blocker 10 and the target dose distribution can be obtained. Then, when a plurality of blockers 10 are installed at their respective installation locations, the corresponding relationship between the shapes of the respective blockers 10 and the installation locations is obtained, thereby obtaining the corresponding relationship among the above three items. As a result, the corresponding relationship between the target dose distribution and the installation position can also be obtained.

In the blocker rotary-switching device of the first implementation, a control module may be further included, which can pre-store the corresponding relationship between the target dose distribution and the installation position (i.e., installation location) of the blocker on the rotary switch; the control module outputs control instructions to the rotary switch based on the corresponding relationship, and the rotary switch rotates based on the control instructions, so that the installation location corresponding to the target dose distribution is rotated to the outlet of the accelerating tube. Here, being rotated to the outlet of the accelerating tube may mean that the center of the blocker at said installation location is located on the main axis of the accelerating tube 100.

Alternatively, as shown in FIGS. 4 and 5(*a*) to 5(*b*), a main axis of the blocker rotary-switching device and the axis of the accelerating tube 200 are not collinear, and thus when rotatably switching the blocker, it is easy to make the blocker 10 installed at the installation location and the accelerating tube 200 in the same straight line.

The blocker rotary-switching device according to the present implementation rotatably switches a plurality of blockers 10 with different change amounts to the dose of the same accelerating tube 200 by the rotary switch 20 without replacing the blocker, and merely by simple rotation operation, the accelerating tube of the accelerator can be enabled to output rays with different dose distributions, and the accelerator can be enabled to be applied in various application situations.

Second implementation

Below, the second implementation of the present application will be described in combination with FIGS. 6(*a*) to 6(*b*). The second implementation provides an example of a more specific mechanical structure of a blocker rotary-switching device.

Figure 6A:
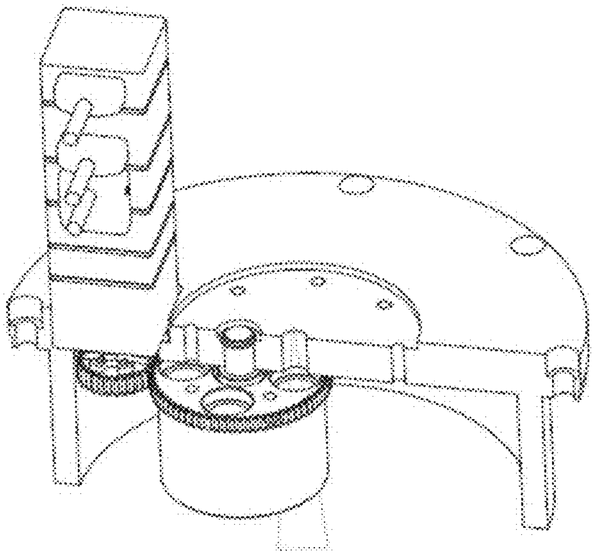
FIGS. 6(*a*) to 6(*b*) are schematic diagrams showing a structure of a blocker rotary-switching device in a second implementation.
Figure 6B:
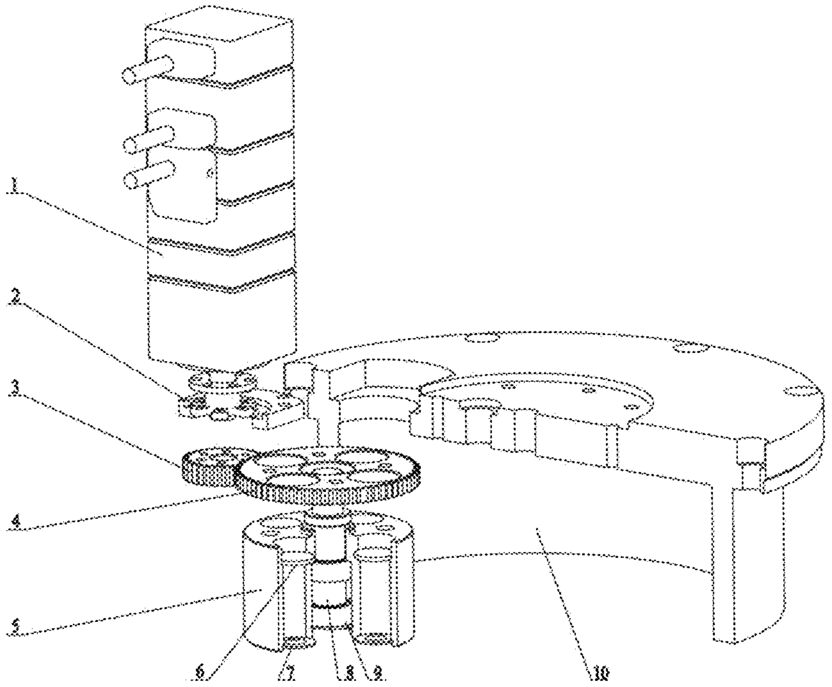

FIGS. 6(*a*) to 6(*b*) are schematic diagrams illustrating the structure of the blocker rotary-switching device of the second implementation FIG. 6(*a*) shows a blocker rotary-switching device after assembly, and FIG. 6(*b*) shows a three-dimensional explosive view of the blocker rotary-switching device.

In the blocker rotary-switching device of the second implementation, the rotary switch includes: a DC servo motor 1, a motor seat 2, a pinion gear 3, a large gear 4, a blocker installation plate 5, a rotating shaft 8, a ball bearing 9, and a base 10.

As shown in FIG. 6, the DC servo motor 1 provides power for the rotary switch to rotate the rotary switch around an axis. Specifically, the DC servo motor 1 provides power to the blocker installation plate 5, causing the blocker installation plate 5 installed with blockers to rotate around its axis, thereby changing positions of the blockers. Here, the DC servo motor 1 functions as a power mechanism. The DC servo motor 1 is an example of the power mechanism, as long as the blocker installation plate 5 can be driven to rotate around its axis, any power mechanism can be used without limitation.

The motor seat 2 is adapted to install the DC servo motor 1 to the base 10. That is, the DC servo motor 1 is installed on the base 10 through the motor seat 2. As a result, the DC servo motor 1 can be installed onto the accelerator.

The pinion gear 3 is fixedly connected to an output shaft of the DC servo motor 1. The rotation of the output shaft of the DC servo motor 1 drives rotation of the pinion gear 3. The pinion gear 3 can be connected to the output shaft of the DC servo motor 1 through screws, for example.

The large gear 4 engages with the pinion gear 3 and is fixedly connected to the blocker installation plate 5. When the pinion gear 3 rotates, the large gear 4 that engages with the pinion gear 3 also rotates, and the large gear 4 drives the blocker installation plate 5 which is fixedly connected with the large gear 4 to rotate, and thus can transmit the rotation of the DC servo motor 1 to the blocker installation plate 5, thereby changing the positions of the respective blockers installed on the blocker installation plate 5.

The blocker installation plate S is used to install the blockers, a plurality of installation locations is provided on the blocker installation plate 5, and the blockers are installed at the installation locations. In FIG. 6, four installation locations are shown, however, other numbers of installation locations are also available.

In FIG. 6, a blocker installation plate 5 in a cylindrical shape is shown, with a plurality of installation locations arranged along a circumferential direction. However, the blocker installation plate 5 is not limited to the cylindrical shape. Optionally, the blocker installation plate 5 is in an axisymmetric shape. Optionally, the respective installation locations have a same radial distance to the axis of the blocker installation plate 5.

As shown in FIG. 6, the installation location is formed as for example a through hole. That is, a plurality of through holes are arranged along the circumferential direction on the blocker installation plate 5.

In the blocker rotary-switching device of the second implementation, the blocker comprises a first stage blocker 6 and a second stage blocker 7.

As shown in FIG. 6, the first stage blocker 6 and the second stage blocker 7 are installed in the through hole of the blocker installation plate 5.

The first stage blocker 6 and the second stage blocker 7 located in a same through hole may be the same or different in shape, thickness, material, and the like, as long as the dose distributions output through the respective installation locations are different from each other, that is, the combinations of the first stage blocker 6 and the second stage blocker 7 in the respective through holes can bring different change amounts to the dose. In addition, although two stages with the first stage blocker 6 and second stage blocker 7 are shown in FIG.

6, the stages of the blockers in each through hole may be other stages, such as three stages, four stages, etc , that is, the blockers in each through hole are not limited to two.

As shown in FIG. 6, by providing a plurality of stages of blockers in the through hole of a same installation location, more combinations of blockers can be provided, thereby providing more combinations of dose distributions, making the application range of the blocker rotary-switching device wider.

The rotating shaft 8 and ball bearing 9 are adapted to install the blocker installation plate 5 onto the base 10. That is, the blocker installation plate 5 is connected to an outer ring of the ball bearing 9, the rotating shaft 8 is connected to an inner ring of the ball bearing 9, and the rotating shaft 8 is fixedly installed on the base 10, so that the blocker installation plate 5 and the gear wheel 4 fixedly connected to each other, can rotate relative to the rotating shaft 8. An axis of the rotating shaft 8 is in the same straight line as the axis of blocker installation plate 5 and the axis of the large gear 4.

The base 10 is adapted to assemble the blocker rotary-switching device with the accelerator. The base 10 is fixedly installed onto the accelerator. For example, the base 10 is installed onto a rack of the accelerator through screws.

As mentioned above, the DC servo motor 1 is fixedly installed on the base 10 through the motor seat 2, the rotating shaft 8 is fixedly installed on the base 10, the base 10 is fixedly installed on the accelerator, and the ball bearing 9 realizes connection between the blocker installation plate 5 and the rotating shaft 8. Therefore, the motor seat 2, the rotating shaft 8, the ball bearing 9, and the base 10 constitutes a fixing-installation mechanism for fixing the rotary switch in the blocker rotary-switching device onto the accelerator. The combination of the motor seat 2, the rotating shaft 8, the ball bearing 9, and the base 10 shown in FIG. 6 is merely an example of the fixing-installation mechanism, and in the present application, any structure can be used and not limited, as long as the structure can fixedly install the blocker rotary-switching device to the accelerator.

In addition, in the blocker rotary-switching device of the second implementation as mentioned above, a control module can further be included, which can pre-store the corresponding relationship between target dose distribution and installation position (i.e., installation location) of the blocker on the rotary switch; the control module outputs control instructions to the rotary switch based on the corresponding relationship. The process of obtaining the control instructions can be as follows: based on the target dose distribution, calculating the corresponding installation location of the blocker, calculating a rotation angle of the blocker installation plate 5 based on the installation location, and calculating a rotation angle of the DC servo motor 1 based on the rotation angle of the blocker installation plate 5.

In this case, the workflow of the blocker rotary-switching device is roughly as follows:

The DC servo motor 1 receives control instructions from the control module to rotate an angle corresponding to the control instructions;

The output shaft of the DC servo motor 1 drives the pinion gear 3 to rotate;

The pinion gear 3 drives the large gear 4 that is engaged with it to rotate to a designated position;

The blocker installation plate 5 rotates along with the large gear 4 to move the installation location corresponding to the target dose distribution to the outlet of the accelerating tube.

The blocker rotary-switching device according to the second implementation achieves rotation switching of the blockers by means of the power mechanism and the transmission mechanism of the rotary switch, and achieves the connection among various components of the rotary switch and the installation of the rotary switch with the accelerator by means of the fixing-installation mechanism, thereby enabling the rotary switch to switch the plurality of blockers located at different installation locations without replacing the blockers, and merely by simple rotation operations, changes of the dose distribution output by the accelerator's accelerating tube can be achieved.

Although the embodiments and specific embodiments of the present application are described in combination with the accompanying drawings as above, the person skilled in the art can make various modifications and variations without departing from the spirit and scope of the present application, and such modifications and variations all fall within the scope defined by the claims.

What is claimed is:

1. A modifier rotary-switching device, comprising:

a plurality of modifiers for changing dose distribution of rays output from an accelerating tube of an accelerator, the plurality of modifiers comprising modifiers which have different change amounts to the dose distribution; and a rotary switch installed with the plurality of modifiers and switching positions where the modifiers are installed by rotation so as to locate the modifier at an installation position corresponding to a target dose distribution at an outlet of the accelerating tube, wherein each of the plurality of modifiers is configured to allow the rays to pass through its solid material to obtain respective target dose distribution, wherein the modifier rotary-switching device further comprises a control module, the control module pre-stores corresponding relationship between the target dose distribution and the installation position of the modifier on the rotary switch, and based on the corresponding relationship, the control module outputs control instructions to the rotary switch, the rotary switch rotates based on the control instructions, so that the modifier at the installation position corresponding to the target dose distribution is located at the outlet of the accelerating tube.

2. The modifier rotary-switching device according to claim 1, wherein the plurality of modifiers comprises modifiers in different shapes.

3. The modifier rotary-switching device according to claim 1, wherein the rotary switch comprises a modifier installation plate, which comprises a plurality of installation locations, and the plurality of modifiers is installed at the plurality of installation locations of the modifier installation plate.

4. The modifier rotary-switching device according to claim 3, wherein dose distributions of the rays output by the accelerating tube and penetrating through the respective installation locations are different from each other.

5. The modifier rotary-switching device according to claim 4, wherein the rotary switch further comprises:

a power mechanism that provides power for the rotary switch to rotate the rotary switch around an axis;

a transmission mechanism that transmits the power from the power mechanism to the modifier installation plate; and a fixing-installation mechanism that fixes and installs the rotary switch onto the accelerator.

6. The modifier rotary-switching device according to claim 5, wherein the power mechanism comprises a DC servo motor, the fixing-installation mechanism comprises a motor seat and a base, the servo motor is fixedly installed on the base through the motor seat, and the base is fixedly installed on the accelerator.

7. The modifier rotary-switching device according to claim 6, wherein the transmission mechanism comprises a pinion gear and a large gear, the pinion gear is connected to an output shaft of the DC servo motor, the large gear engages with the pinion gear, and the modifier installation plate is fixedly connected with the large gear.

8. The modifier rotary-switching device according to claim 7, wherein the fixing-installation mechanism further comprises: a rotating shaft, and a ball bearing, the modifier installation plate is installed on the base through the rotating shaft and the ball bearing.

9. The modifier rotary-switching device according to claim 4, wherein on each installation location, one modifier is provided, and each modifier has a shape different from that of other modifiers.

10. The modifier rotary-switching device according to claim 4, the modifier installation plate is formed as a single cylindrical body, the plurality of installation locations are formed as a plurality of through holes spaced apart from each other along a circumferential direction of the modifier installation plate, and at least two modifiers are installed in one through hole and spaced apart from each other along an axial direction of said one through hole.

11. An accelerator, comprising:

an accelerating tube; and the modifier rotary-switching device according to claim 1.

12. A control method for a modifier rotary-switching device, wherein:

the modifier rotary-switching device is the modifier rotary-switching device according to claim 1, and the control method comprises:

outputting control instructions to the rotary switch based on pre-stored corresponding relationship between the target dose distribution and the installation position of the modifier on the rotary switch; and rotating the rotary switch based on the control instructions, so that the modifier at the installation position corresponding to the target dose distribution is located at the outlet of the accelerating tube.

* * * * *